Patented Nov. 20, 1945

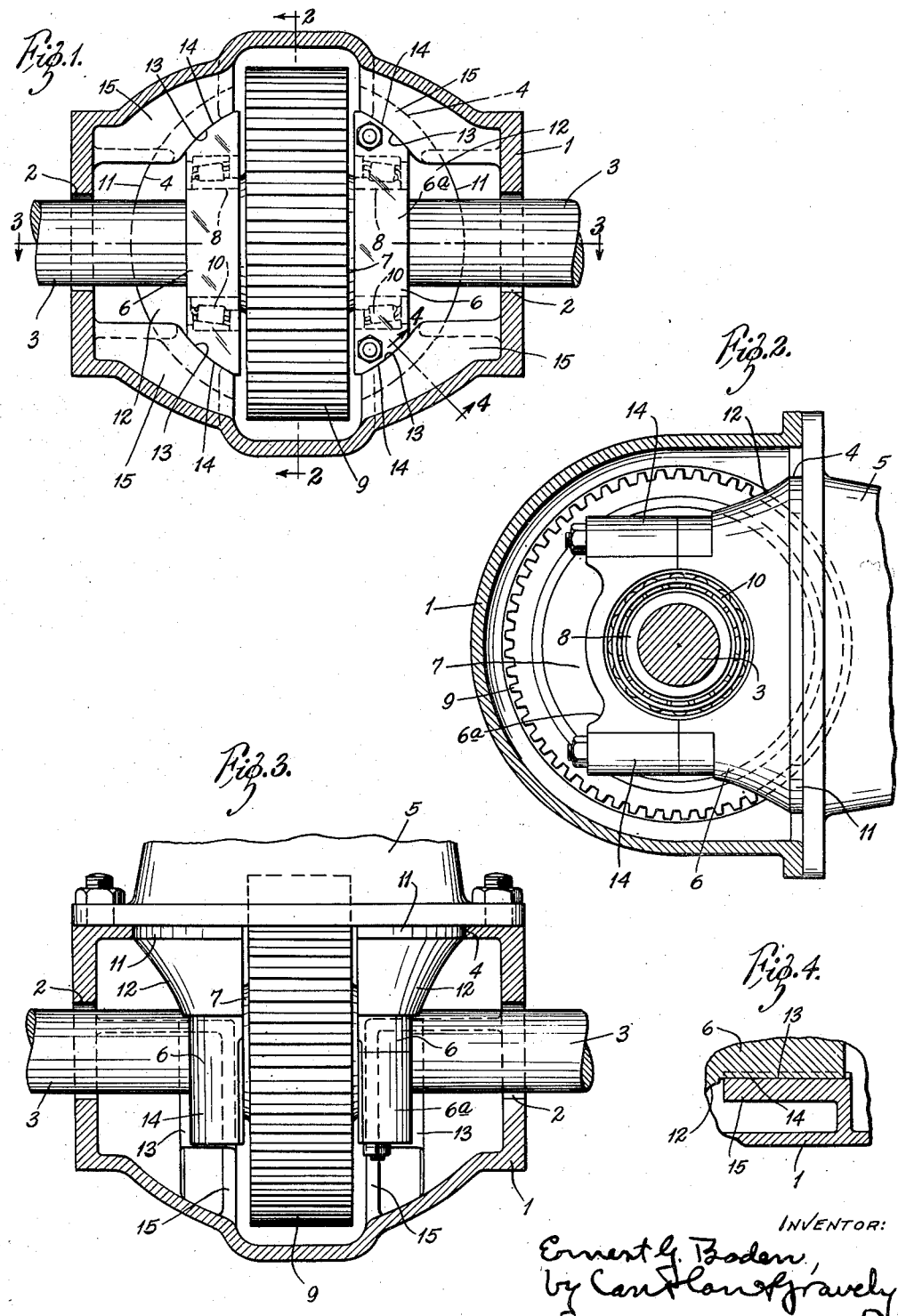

2,389,484

UNITED STATES PATENT OFFICE 2,389,484

AUTOMOTIVE DRIVING AXLE CONSTRUCTION

Ernest G. Boden, Canton, Ohio, assignor to The Timken Roller Bearing Company, Canton, Ohio, a corporation of Ohio Application December 9, 1944, Serial No. 567,449

11 Claims. (Cl. 74—310)

This invention relates to automotive driving axle constructions of the type wherein a gear carrier is removably secured to the axle housing and closes an opening in one side thereof and has a pair of spaced pedestals that extend into said housing through said opening, and the differential gear case is located between said pedestals with its axle shaft receiving hub journaled in rotary antifriction bearings mounted in said pedestals. In such axle constructions, the two bearing containing pedestals of the gear carrier are disposed within the axle housing without any direct support therefrom, with the result that there is a tendency for the two pedestals to spread or deflect under extreme service conditions and thus reduce the efficiency and life of the gears and bearings. The present invention has for its principal object to provide proper support for the pedestals in the axle housing and thus overcome the disadvantage hereinbefore referred to. Other objects are simplicity and cheapness of construction and compactness of design. The invention consists in providing the axle housing with interior abutment surfaces for supporting the gear carrier pedestals against spreading or deflection in said housing; and it also consists in the combinations and arrangements of parts hereinafter described and claimed.

In the accompanying drawing, which forms part of this specification and wherein like symbols refer to like parts wherever they occur, Fig. 1 is a central vertical section through an automotive driving axle construction embodying my invention, the gear carrier being shown in end elevation, Fig. 2 is a vertical cross-sectional view on the line 2—2 in Fig. 1, the carrier being shown in end elevation, Fig. 3 is a horizontal section on the line 3—3 in Fig. 1, the gear carrier being shown in plan view; and Fig. 4 is a fragmentary sectional view on the line 4—4 in Fig. 1.

In the accompanying drawing, my invention is shown embodied in an automotive driving axle construction comprising a cast metal axle housing 1 having alined openings 2 in the opposite ends thereof adapted to receive axially alined driving axle or shaft sections 3. The middle portion of the axle housing 1 is enlarged to accommodate the differential driving mechanism and has a substantially circular opening 4 in its front wall. A differential gear carrier 5 is removably secured to the front wall of the axle housing 1 and has a pair of pedestals 6 that project horizontally therefrom through the opening 4 in said housing and are spaced apart longitudinally thereof and support the differential mechanism and its supporting bearings. The differential mechanism includes a differential gear casing 7 which is located between the pedestals 6 and has a tubular hub portion 8 adapted to receive the driving axle sections 3. The drum or casing 7 also has a ring gear 9 thereon of any desired type that is driven by a pinion or other suitable driving member (not shown) mounted in the carrier 5. The pedestals 6 have alined openings therethrough in which are mounted suitable rotary antifriction bearings 10 for rotatably supporting the end portions of the tubular axle shaft receiving hub portion 8 of the differential gear case 7. In accordance with common practice, one of the pedestals 6 is split in a vertical plane to provide a removable cap 6a which permits the gear casing 7 and its supporting bearings 10 to be mounted in and dismounted from the pedestals. The automotive differential driving axle construction thus far described is well known and it is considered unnecessary to illustrate it in detail.

As shown in the drawing, the pedestals 6 have concentric circular locating shoulders 11, which fit within the opening 4 in the axle housing 1, and tapered portions 12 that serve to pilot said shoulders in said opening. The axle housing 1 has concentric concave arcuate abutment faces 13 formed therein integral therewith that extend crosswise of said housing from the rear wall thereof above and below the two pedestals 6 therein; and said pedestals are provided outwardly beyond the tapered pilot portions 12 thereof with correspondingly curved convex top and bottom surfaces 14 that are concentric with and disposed in abutting relation to said concave surfaces substantially throughout the length thereof. By this arrangement, the convex surfaces 14 of the pedestals 6 snugly fit the concave abutment faces 13 in the axle housing 1, whereby said pedestals are prevented from deflecting in all directions, thus increasing the efficiency and life of the gears and bearings.

For convenience in manufacture, the concave thrust or abutment surfaces 13 of the axle housing 1 are bored concentric with the pedestal receiving opening 4 in the front wall of said housing; and likewise, the convex surfaces 14 of the pedestals 6 are machined concentric with the circular locating shoulders 11 thereof. As shown in the drawing, the curved abutment surfaces 13 are formed on ribs 15 that are integral with the housing 1 and serve to stiffen and strengthen the same in the regions of the pedestals 6. The concave abutment surfaces 13 in the axle housing 1 may be located so as to cooperate with the pedestals 6 on either side of the bearing axis or on either or both sides of said axis, as shown.

What I claim is:

1. A housing having end openings and a side opening, shafts extending into said housing through the end openings thereof, a gear carrier fixed to said housing and having two spaced pedestals extending into said housing through the side opening thereof, and a differential gear unit journaled in said pedestals in operative relation to said shafts, said housing having inside abutment members adapted and arranged to support said pedestals against movement in said housing in directions transverse thereto and longitudinally thereof.

2. A housing having shaft receiving openings in the ends thereof and an opening in one side thereof, shaft sections extending into said housing through the openings in the ends thereof, a gear carrier fixed to said housing and having two pedestals that project horizontally into said housing through the side opening therein in spaced apart relation longitudinally thereof, and a differential gear case journaled in said pedestals in operative relation to said shaft sections, said housing having abutment ribs rigid therewith adapted and arranged for cooperation with said pedestals to prevent vertical and horizontal deflection thereof in said housing.

3. The combination as set forth in claim 2, wherein said abutment ribs cooperate with the top and bottom surfaces of said pedestals.

4. The combination as set forth in claim 2, wherein the abutment ribs are formed with concave surfaces having a common center and said pedestals have top and bottom convex surfaces disposed concentric with and sealing against said concave surfaces.

5. The combination as set forth in claim 2, wherein the pedestals have concentric convex top and bottom surfaces and said abutment members have concave surfaces concentric with and engaged by said convex top and bottom surfaces of said pedestals.

6. An automotive differential driving axle construction comprising an axle housing having openings in the ends thereof and an opening in one side thereof, driving axle sections extending into said housing through the openings in the ends thereof, a gear carrier fixed to said housing and having two pedestals extending horizontally into said housing through the opening in the side thereof and spaced apart longitudinally thereof, rotary antifriction bearings mounted in said pedestals, a differential gear case located between said pedestals and having a hub portion journaled in the bearings therein and adapted to receive the adjacent ends of said axle sections, said housing having abutment members integral therewith and adapted and arranged to cooperate with the top and bottom surfaces of said pedestals to prevent vertical and horizontal deflection of said pedestals in said housing.

7. The combination as set forth in claim 6, wherein the abutment members cooperate with the top and bottom surfaces of said pedestals.

8. The combination as set forth in claim 6, wherein the abutment members cooperate with said pedestals above and below the bearings therein.

9. The combination as set forth in claim 6, wherein the abutment members have concentric concave abutment surfaces and the pedestals have concentric convex top and bottom surfaces cooperating with said concave abutment surfaces.

10. The combination as set forth in claim 6, wherein the pedestals have locating portions fitting said side opening and have concentric convex top and bottom surfaces, and said abutment members have concave faces concentric with and engaged by said convex top and bottom surfaces of said pedestals.

11. An automotive differential driving axle construction comprising an axle housing having openings in the ends thereof and a substantially circular opening in one side thereof, driving axle sections extending into said housing through the openings in the ends thereof, a gear carrier fixed to said housing and having two pedestals extending into said housing through the side opening therein and spaced apart longitudinally thereof, said pedestals having circular locating portions fitting said side opening, rotary antifriction bearings mounted in said pedestals, a differential gear case located between said pedestals and having a hub portion journaled in the bearings therein, said housing having interior abutment members with concave surfaces disposed concentric with said side opening, and said pedestals having convex top and bottom surfaces disposed concentric with said circular locating portions and seating against said concave surfaces of said interior abutment members of said housing.

ERNEST G. BODEN.

CERTIFICATE OF CORRECTION.

Patent No. 2,389,484.

November 20, 1945.

ERNEST G. BODEN.

It is hereby certified that error appears in the printed specification of the above numbered patent requiring correction as follows: Page 2, first column, line 34, claim 3, for "wiih" read --with--; line 40, claim 4, for "sealing" read --seating--; line 55, claim 6, and second column, line 45, claim 11, for "ihe" read --the--; and that the said Letters Patent should be read with this correction therein that the same may conform to the record of the case in the Patent Office.

Signed and sealed this 19th day of February, A. D. 1946.

Leslie Frazer (Seal)         First Assistant Commissioner of Patents.